United States Patent Office.

CYRENIUS C. FITZGERALD, OF NEW YORK, N. Y., ASSIGNOR TO THE FLETCHER MARBLE COMPANY, OF SAME PLACE.

Letters Patent No. 104,007, dated June 7, 1870.

IMPROVEMENT IN TREATING MARBLE TO PRESERVE IT.

The Schedule referred to in these Letters Patent and making part of the same

*To all whom it may concern:*

Be it known that I, CYRENIUS C. FITZGERALD, of New York, in the county of New York and State of New York, have invented certain new and useful Improvements in the Method of Treating Marble for Preventing Stains; and I do hereby declare that the following is a full, clear, and exact description thereof.

The nature of my invention consists in so manipulating marble as to render it impervious to stains of any kind, which I call "solidifying marble," (a process entirely distinct from coloring,) using any white marble, Italian or Vermont, statuary, Brandon, &c., solidifying it without materially changing its color other than to make it transparent, and thus rendering it forever impervious to ink stains, or any other ordinary and accidental occurrences, such as spilling oil, paints, varnishes, strong alkalies, inks, &c.

Many of the fluids commonly used, and which often get spilt on marble, contain acids antagonistic to the glassed surface of marble, and will dissolve and destroy the glass or polish; I do not provide against this, but simply so prepare the stone as not to admit any penetrating agency in ordinary use to possess itself of the inner portions of the marble, while it may disintegrate the polish, and lie on the surface of the stone below the polish. It will be readily removed with water and brush, and the surface repolished to exactly correspond with any other surface of the same stone equally manipulated.

The white statuary marble is rendered transparent like alabaster, and common white marble like unprepared statuary, acquiring that soft, white, glassy appearance so desirable in marble.

My experiments have been on a so-solidified marble, placing it into a bath of red aniline dissolved in alcohol at 95°, and take the top out, repolish, and its color was not changed a particle.

Pour ink on a stone solidified, let it dry, and after two or more hours remove it with a clean brush, water, and soap, and the surface will be alike pure as the balance of the stone. The acid in ink will dissolve the polish, and it must necessarily be repolished to exactly correspond with the other surface.

It is, of course, understood that any polished surface has a shade difference in color to a surface unpolished on the same stone, so the first impression is that ink has changed its color a very little ; but this is not so; repolish, and the perfection desired is found.

In order to enable others skilled in the art to which my invention appertains to make and use the same, I will now proceed to describe the manner in which marble is so manipulated as to render it impervious to stains.

The stone is cleaned as perfectly as possible with a scouring-brush and water, so as to rid its surface of dust, and open the pores already filled with dust in shaping the marble.

Place it in a drying-chamber of 120° heat for twenty-four hours, to thus evaporate the water, and the stone, on examination, will be as a dry sponge, and anything in liquid form will penetrate.

Prepare a batch of pure white wax, Havana beeswax, silicate of soda and potash, or of any kind of wax or stearine soluble by heat; bring them nearly to a boiling heat, say 175° to 200° Fahrenheit.

Place the marble just from the drying-chamber into this solution for two hours, four hours, or more, proportioned to its thickness. Two hours will suffice for a stone one inch thick.

Take the stone out, hone and polish in the usual way, and the work is completed.

The application of heat to the stone will, of course, expand the filling, and one would think it would find its way to the surface; but, by first cooling, it contracts in the pores exactly what it formerly expanded during its introduction to heat.

Any heat that will not injure the texture of the marble will not eject the filling. Again, heat will expand the filling, and likewise expand the stone, so that the increased room required by the expansion of the filling is afforded by the expansion of the pores to be filled. I use the white wax in preference to other substances.

If the silicate is used, make a solution, five parts pure water to one part of silicate of soda and of potash, of equal parts combined; and, instead of one bath, five baths are required. After each bath place the stone into the drying-room to evaporate the water, and this leaves a solid deposit of silica or liquid glass, which will harden of itself.

Having thus fully described my invention,

What I claim as new, and desire to secure by Letters Patent, is—

The above-described process of rendering marble impervious to stains, substantially as set forth.

In testimony that I claim the foregoing as my own, I affix my signature in presence of two witnesses.

C. C. FITZGERALD.

Witnesses:
 H. B. SMITH,
 A. P. SMITH.